(12) United States Patent
Stegmann et al.

(10) Patent No.: US 11,215,249 B2
(45) Date of Patent: Jan. 4, 2022

(54) BEARING ELEMENT

(71) Applicant: SAF-HOLLAND GmbH, Bessenbach (DE)

(72) Inventors: Rainer Stegmann, Hösbach (DE); Marco Krebs, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 207 days.

(21) Appl. No.: 15/749,707

(22) PCT Filed: Jul. 29, 2016

(86) PCT No.: PCT/EP2016/068168
§ 371 (c)(1),
(2) Date: Feb. 1, 2018

(87) PCT Pub. No.: WO2017/021302
PCT Pub. Date: Feb. 9, 2017

(65) Prior Publication Data
US 2018/0231077 A1     Aug. 16, 2018

(30) Foreign Application Priority Data

Aug. 3, 2015 (DE) .................. 10 2015 112 715.6

(51) Int. Cl.
   *F16D 65/09*    (2006.01)
   *F16D 51/20*    (2006.01)
   *F16C 35/067*    (2006.01)

(52) U.S. Cl.
CPC ............ *F16D 65/09* (2013.01); *F16C 35/067* (2013.01); *F16D 51/20* (2013.01); *F16C 2326/01* (2013.01)

(58) Field of Classification Search
CPC ........ F16D 65/09; F16D 51/20; F16C 35/067; F16C 2326/01
See application file for complete search history.

(56) References Cited

U.S. PATENT DOCUMENTS 3,165,815 A * 1/1965 Wogerbauer ........ B21C 37/0803
   29/897
3,548,976 A * 12/1970 Dombeck ............... F16D 51/24
   188/340

(Continued)

FOREIGN PATENT DOCUMENTS

CN     102483111     5/2012
CN     103339401     10/2013

(Continued)

OTHER PUBLICATIONS

Doege, Eckart; Behrens, Bernd-Arno: Handbuch Umformtechnik. 2. Aufl. Heidelberg [u.a.] : Springer, 2010 S. 48-49.—ISBN 978-3-642-04248-5 (http://www.springer.com/de/book/9783642042485).

*Primary Examiner* — Melody M Burch
(74) *Attorney, Agent, or Firm* — Price Heneveld LLP

(57) ABSTRACT

A bearing element for use in a drum brake includes a holding region for interlocking on a brake shoe and a support region for indirect or direct support on a carrying unit, wherein the holding region has a first holding geometry which is designed to form an undercut with the brake shoe along a first holding axis, wherein the support region is designed to transmit a support force, which acts along the holding axis, indirectly or directly to the carrying unit, and vice versa.

24 Claims, 3 Drawing Sheets

(56) References Cited

U.S. PATENT DOCUMENTS

| | | | |
|---|---|---|---|
| 4,167,990 A * | 9/1979 | Steer | F16D 65/09 |
| | | | 188/106 A |
| 5,443,135 A | 8/1995 | Redgrave | |
| 6,050,371 A * | 4/2000 | Krautkremer | F16D 65/563 |
| | | | 188/106 A |
| 6,345,708 B1 | 2/2002 | Fujiwara | |
| 6,364,076 B1 * | 4/2002 | Braun | F16D 65/22 |
| | | | 188/327 |
| 2004/0245059 A1 * | 12/2004 | Maehara | F16D 51/48 |
| | | | 188/325 |
| 2012/0103737 A1 | 5/2012 | Drewes | |

FOREIGN PATENT DOCUMENTS

| | | |
|---|---|---|
| CN | 103935188 | 7/2014 |
| DE | 546795 | 3/1932 |
| DE | 10156058 | 6/2003 |
| DE | 102006012542 | 12/2007 |
| FR | 2150423 | 4/1973 |
| FR | 2150423 | 10/1975 |
| GB | 343197 | 2/1931 |
| JP | 2001074078 | 3/2001 |

* cited by examiner

BEARING ELEMENT

BACKGROUND OF THE INVENTION

The present invention relates to a bearing element, in particular for use with a brake shoe of a drum brake of a utility vehicle.

In the case of brake shoes known from the prior art, it is customary to subject the brake shoes to a force at a first distal end by means of an actuating unit, for example an expanding wedge unit or an S cam actuating unit, and to mount said brake shoe pivotably at a second end on a brake anchor plate. High forces have to be transmitted here in the region of the pivotable mounting of the brake shoe, and multi-dimensional pivotability of the brake shoe relative to the brake anchor plate is required in order not only to be able to carry out the actuating movement of the brake shoe when a braking operation is initiated, but also to be able to compensate for deformations of the brake drum in such a manner that the full lining surface of the brake lining of the brake shoe always comes to bear against the inner side of the brake drum. Up to now in the prior art, bearings with a ball and an appropriately corresponding ball socket have been provided both on the brake anchor plate and on the brake shoe. Said bearings known from the prior art have the disadvantage that they are firstly heavy and secondly at least three components always have to be handled for their installation. The outlay on installation for such a brake shoe bearing is therefore relatively high and increases the manufacturing costs for drum brakes known from the prior art.

It is the object of the present invention to provide a bearing element for drum brakes that can be produced in a simple manner and requires as little outlay on installation as possible. Furthermore, the weight of the bearing of brake shoes is intended to be reduced.

SUMMARY OF THE INVENTION

According to the invention, the bearing element comprises at least one holding region for interlocking on a brake shoe and a support region for indirect or direct support on a carrying unit, wherein the holding region has a first holding geometry which is designed to form an undercut with the brake shoe along a first holding axis, wherein the support region is designed to transmit a support force, which acts along the holding axis, indirectly or directly to the carrying unit, and vice versa. Within the context of the present invention, a brake anchor plate is preferably regarded as the carrying unit. The carrying unit has in particular preferably at least one bearing socket for the pivotable bearing of a brake shoe. The holding region of the bearing element advantageously has at least one projection or recess which can be brought into interlocking engagement with a respectively corresponding projection or recess on a brake shoe in such a manner that an undercut is produced along a first holding axis between the engagement portion of the brake shoe and the holding region of the bearing element. The first holding geometry of the holding region on the bearing element is preferably designed here as a sheet metal lip protruding or springing back from the rest of the geometry of the holding region. In the present context, a sheet metal lip denotes in particular a region in a metal sheet that, except for a connecting edge to the rest of the sheet metal body, is cut out of the sheet metal body and bent in such a manner that it projects out of the sheet metal-type geometry of the sheet metal body. It has been shown that holding geometries designed in such a manner can be produced particularly simply since only a local separating operation has to be carried out, and the first holding geometry is merely bent out of the material of the bearing element. In particular, a low weight is obtained here since no additional weight is produced by the provision of projections on, for example, a cast body. The support region is designed to be supported on a carrying unit of a brake system directly, or indirectly, thus, for example, via a force transmission element arranged inbetween. This means that the support region preferably has a contact surface which can either be brought to bear directly on the carrying unit, or a corresponding receiving region for receiving a ball which is known from the prior art and preferably serves as a force transmission element. It has been shown that the design of the bearing element with a holding region and a support region permits particularly simple use in a multiplicity of different drum brakes, in particular in cooperation with different brake shoes for drum brakes. For this purpose, the holding region can particularly preferably also have a multiplicity of different first holding geometries, of which in each case only selected holding geometries are designed for securing to a certain type of brake shoe.

Particularly preferably, the holding region has two first holding geometries, wherein a first holding geometry is arranged respectively on a limb of the bearing element, said holding geometries being able to be brought into interlocking engagement with one shoe web each of the shoe unit. The bearing element is therefore particularly preferably designed for securing on a brake shoe which has two shoe webs. For this purpose, the bearing element has a holding region which comprises two limbs, on each of which a first holding geometry is arranged. The two limbs of the holding region are preferably spaced apart from each other, wherein the limbs particularly advantageously extend substantially transversely with respect to the support region, that is to say, in other words, substantially transversely with respect to the main extent of the support region. Therefore, in cross section, the support region together with the two limbs advantageously forms a substantially u-shaped or c-shaped contour. By a first holding geometry being provided on the two limbs of the bearing element, a particularly fixed interlocking connection can be produced between the bearing element and a brake shoe, said interlocking connection improving the transmission of forces, vibrations and torques acting on the brake shoe. This ensures improved security against the bearing element being detached from the brake shoe.

The support region is advantageously substantially arranged between the first holding geometries. Within the context of the present invention, an arrangement substantially between the first holding geometries is considered to be an arrangement of the support region, in which a projection of the support region into a plane spread out between the holding geometries intersects a line running between the holding geometries. In other words, in a view along the holding axis, the support region intersects an imaginary line running between the holding geometries. The advantage of this arrangement of the holding geometries relative to the support region is that a force acting on the support region can be transmitted as uniformly as possible to the holding geometries. In addition, warping of the bearing element due to transmission of load on one side can be reduced.

Particularly preferably, the support region is substantially arranged centrally above and between the first holding geometries. An arrangement centrally and above the holding geometries is defined in that a projection of the support portion into a plane running through the two holding geometries is arranged centrally to a line running between the holding geometries. The surface center point of the projection is preferably arranged here centrally on the line between the holding geometries. In particular for the preferred case in which the support region is of plane-symmetrical design, the plane of symmetry of the support region runs orthogonally to a line running between the holding geometries and intersects said line centrally. The advantage of this embodiment is that substantially the same amounts of force are always received in the holding geometries, and therefore an optimum adaptation of the material thickness of the holding geometries to the forces to be anticipated is possible. An overdimensioning of the holding geometries for safety reasons can thereby be minimized.

Furthermore preferably, the holding region has a second holding geometry, wherein the second holding geometry is designed to transmit a support force from the bearing element to the brake shoe in only one direction along the holding axis. The second holding geometry preferably serves here to support the interlocking connection which is produced by the first holding geometry. In a first preferred embodiment, the second holding geometry is designed as a shoulder which is formed on the holding region and is provided to be supported on a corresponding rest surface on the brake shoe. The second holding geometry preferably substantially transmits a force which occurs when the bearing element is supported on the brake shoe. In other words, the second holding geometry preferably transmits the greatest portion of the force which is transmitted by the brake anchor plate or the carrying unit to the shoe element or to the brake shoe. This force is comparatively high in comparison to the holding forces in other directions since, during a braking operation, the two distal ends of the brake shoe are pressed with a high force against the inner side of the brake drum. The force acting between the carrier unit and the brake shoe is therefore essentially as large as the actuating force transmitted to the brake shoe by an actuating unit. It therefore goes without saying that the second holding geometry in particular has to be designed to transmit a particularly high support force from the bearing element to the brake shoe along the holding axis.

Particularly preferably, the second holding geometry is designed as a shoulder which can be brought to rest on a surface or edge of the brake shoe. For the transmission of the support force, the second holding geometry has an extent substantially transversely with respect to the holding axis. The second holding geometry therefore extends substantially transversely with respect to the overall extent of the holding region. Owing to the shoulder-shaped design of the second holding geometry, the risk of shearing off at the bearing element can preferably be prevented.

The bearing element is particularly preferably designed as an integral sheet metal component. It has been shown that, in particular with regard to the manufacturing costs, the design of the bearing element as a sheet metal part achieves a significant cost saving and time saving during production. In particular in comparison to brake shoe elements which are known from the prior art and are designed as a cast part, the manufacturing outlay is significantly lower since less complex machinery is required and the time required, for example, for cooling the cast components is not needed. The design of the bearing element as an integral sheet metal part also has significant advantages in comparison to bearing elements produced by welding since in particular the material distortion and the thermal stresses in the bearing element are significantly smaller in the present invention. Furthermore, it has been shown that, in the case of a sheet metal body formed by forming, particularly advantageous material properties can be produced. Thus, in the case of the forming, in particular preferably in the case of cold forming, local material strengthening is achieved, which is also known as what is referred to as strain hardening, and in particular permits an increase in the service life and in the maximum transmittable forces via the bearing element. The integral design of the bearing element in particular reduces the outlay on installation since individual parts do not have to be joined together, for example by welding. At the same time, the thermal distortion at the regions entering into engagement with other components of a brake shoe or brake anchor plate (holding region, support region) is achieved with greater dimensional accuracy.

In a particularly preferred embodiment, the first holding geometry is designed as a resettable cantilever region, or is preferably of arrow-shaped design, wherein the first holding geometry can be brought with a smaller force along the holding axis into engagement with the brake shoe and ensures a secure interlocking connection with the brake shoe in the opposite direction. The cantilever region preferably projects outward or protrudes from the limb of the bearing element. The first holding geometry is therefore particularly preferably designed to be "clipped in" at the brake shoe. This facilitates the installation of the bearing element on the brake shoe and saves time and makes it possible for a fitter with only minimal use of tools to bring a brake shoe into interlocking engagement with the bearing element. It goes without saying that the first holding geometry here is elastically deformed during the installation process and, by means of the elastic resetting force of the preferably metallic production material of the bearing element, seeks a position in which an interlocking connection is produced when the first holding geometry is fully fitted in the appropriate corresponding engagement geometry on the brake shoe.

In a preferred embodiment, the support region has a receiving geometry for receiving a force transmission body, wherein the force transmission body transmits the support force acting between the carrying unit and the bearing element. A ball, particularly preferably composed of hardened material or with at least a hardened surface is suitable as the force transmission body. Said ball permits a pivoting movement of the brake shoe relative to the carrying unit with pivoting directions which are possible in an extent of 360 degrees starting from the holding axis. The advantage of the use of a force transmission body in the form of a ball is that the latter can be acquired cost-effectively commercially and a long service life can be achieved by the corresponding adaptation of the surface hardness. Furthermore, the force transmission body can be simply exchanged independently of the bearing element and the carrying unit when the service life limit or excessive wear are reached or in the event of local damage. As an alternative to the spherical design, the force transmission body could also be of barrel-shaped design, as a result of which different pivoting movements and possible pivoting angles arise in different pivoting directions from the holding axis.

In an alternative embodiment, the support region of the bearing element is of convex design, and wherein the convex side of the support region is arranged on that side of the bearing element which faces away from the first holding geometry. As an alternative to the design of the support region in such a manner that the latter has a receiving geometry for receiving a force transmission body, the support region itself is of convex design, wherein the convex side of the support region is therefore designed similarly to the outer surface of a preferably spherical force transmission body. An integration of functions on the bearing element can thereby be carried out since, firstly, the function of the support on the brake shoe element and, secondly, the function of the pivotable bearing of the brake shoe on the carrying unit can be integrated via a preferably spherical supporting geometry in the bearing element. In this manner, the number of required components can be significantly reduced, as a result of which the manufacturing outlay is overall reduced and the outlay on installation for producing a brake shoe for a drum brake is significantly reduced. Furthermore, the production costs for an integral bearing element by forming from a sheet metal part are comparatively low for producing a hardened ball element and a corresponding bearing socket. Furthermore, the design of the support region is such that it replaces the convex outer surface of a separate force transmission element substantially more easily than a unit which is composed of a force transmission element and a corresponding support element. The convex side of the support region is preferably arranged here on that side of the bearing element which is opposite the first holding geometry. That is to say, in other words, that the support region substantially faces away from the first holding geometry and therefore also from the brake shoe element which is provided for securing on the bearing element.

Particularly preferably, the bearing element has a wall thickness measured in each case perpendicularly to the outer surface, wherein the deviation of the wall thickness from an average wall thickness does not exceed 0.01 to 0.2 times, preferably 0.01 to 0.1 times and particularly preferably 0.05 to 0.1 times the average wall thickness. In other words, the wall thickness of the bearing element preferably remains substantially constant despite the forming operations carried out thereon, that is to say, in other words, that the deviation of the wall thickness from the average wall thickness preferably does not exceed 0.2 times the average value of the wall thickness. This ensures that in those regions of the bearing element which are deformed to differing extents, in particular in the region of the support region and the first holding geometry, a sufficiently high wall thickness is always available in order to be able to transmit the forces acting on the bearing element and forces transmitted from the bearing element to the brake shoe with a high degree of reliability. Particularly preferably, the production of the bearing element is provided in such a manner that the wall thickness has a deviation of merely 0.01 times the average wall thickness, as a result of which in particular also the manufacturing operations on the bearing element can be carried out with lower energy consumption since a lower degree of deformation is produced at the sheet metal part.

Particularly preferably, the bearing element is produced by cold forming, wherein there is a strain hardened structure in the deformation region. A strain hardened structure is distinguished by high strength and an increased security against fracture and an increased yield strength. The strain hardened structure is produced here by the structure displacements and structure deviations taking place during the forming operation. In this manner, a higher strength can thereby be achieved in the region of the cold formed support region of the bearing element and in the region of the strain hardened first holding geometry and the strain hardened second holding geometry, and therefore the forces which can be absorbed by the bearing element are significantly increased. Furthermore, it can be preferred that a surface sealing or surface hardening is provided in the support region of the bearing element. In particular preferably, a greater hardness can be achieved in the support region by chemical surface treatment, said greater hardness permitting an increase in the service life at those surfaces of the support region which rub against the carrying unit.

BRIEF DESCRIPTION OF THE DRAWINGS

Further advantages and features of the present invention emerge from the description below of selected embodiments with reference to the attached figures. It goes without saying that individual features which are shown only in one of the embodiments can also be used for other embodiments unless prevented or explicitly excluded because of technical circumstances. In the figures.

DETAILED DESCRIPTION OF THE PREFERRED EMBODIMENTS

Figure 1:
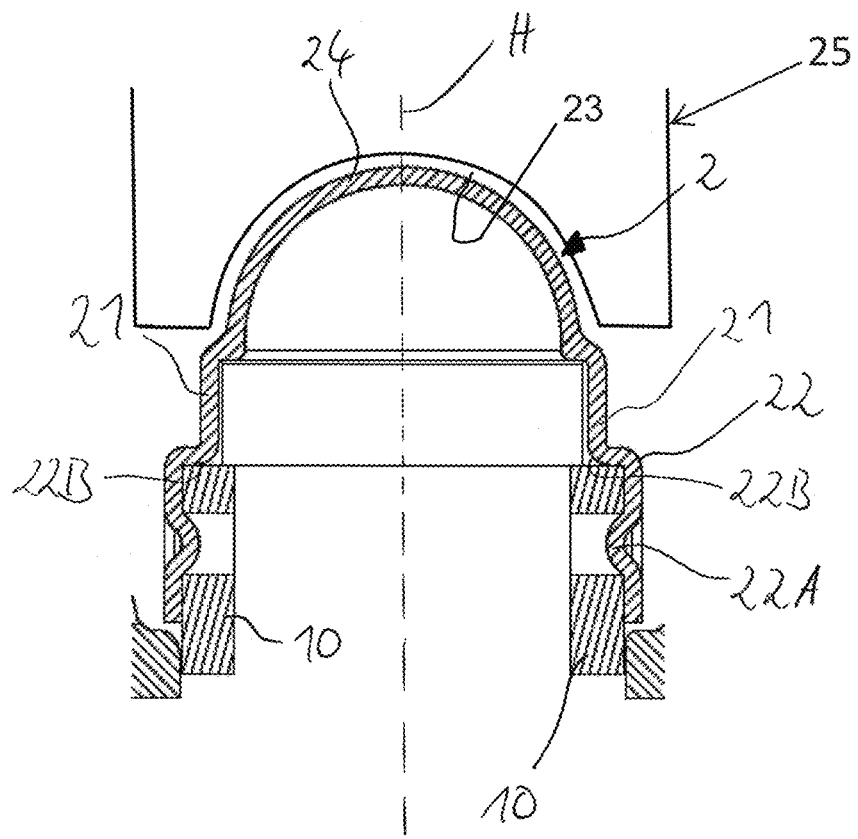
FIG. 1 shows a sectional view of a preferred embodiment of the bearing element.

The bearing element 2 illustrated in FIG. 1 has a support region 24 and a holding region 22. The holding region 22 in turn preferably comprises two limbs 21 which are secured spaced apart from each other on the support region 24. The support region is preferably curved convexly, in particular preferably curved spherically at least in regions. The holding region 22 has a first holding geometry 22a and a second holding geometry 22b which are each designed for interlocking engagement with a brake shoe 10. In particular preferably, the brake shoe 10 here has two shoe webs 11, of which one in each case can be brought into interlocking engagement with a first holding geometry 22a and a second holding geometry 22b. The first engagement geometry 22a is preferably designed here as a projection which projects in the direction of the brake shoe 10 and is correspondingly in interlocking engagement with a recess provided on the brake shoe 10. The second holding geometry 22b is preferably designed as a shoulder which can be brought to rest and to be supported on a corresponding surface or edge of the brake shoe 10, preferably the shoe web 11 thereof. The second holding geometry 22b preferably transmits a force, which acts longitudinally or parallel to the holding axis H, from the support region 24 via the limbs 21 of the holding region 22 to the brake shoe 10. The bearing element 2 is particularly preferably designed as a sheet metal part. The bearing element 2 is preferably formed integrally here, wherein the corresponding geometries of the support region 24, the holding geometries 22a and 22b, are produced by deformation.

Figure 2:
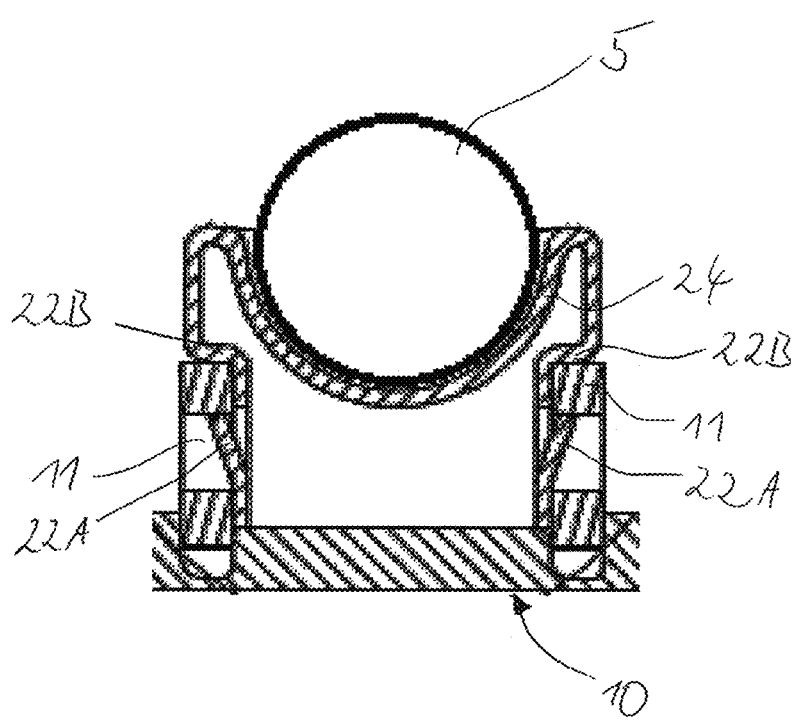
FIG. 2 shows a further preferred embodiment of the bearing element according to the invention.

In the case of the preferred embodiment of the bearing element 2 shown in FIG. 2, the support region 24 is designed for receiving a force transmission element 5. The force transmission element 5 here is preferably a ball which serves for the pivotable bearing of the bearing element on a bearing socket 23 of a carrying unit 25 or on a brake anchor plate of a drum brake system. In a manner corresponding to the external geometry of the force transmission element 5, the support region 24 has a receiving geometry which is of substantially spherical or partially spherical design. Furthermore, it is shown that the first holding geometry 22a is designed as a resettable cantilever region, or, in other words, is substantially arrow-shaped, and is therefore suitable for clipping in the bearing element 2 at a brake shoe 10 or at the brake webs 11 shown in FIG. 2. The bearing element 2 can thereby be brought from above in the figure into interlocking engagement with the brake shoe 10 by a force simply being applied from above and the first holding geometry 22a being temporarily deformed in such a manner that it can slip downward between the shoe webs 11 until the second holding geometry 22b comes to rest on the brake shoe 10 and at the same time the first holding geometry 22a springs back into its original position in such a manner that an interlocking connection arises between the first holding geometry 22a and the appropriately corresponding geometry on the shoe webs 11. In this manner, the bearing element 2 is secured at least against shifting in two directions on the brake shoe 10 via the engagement of the first holding geometry 22a and the second holding geometry 22b. The first holding geometry 22a preferably also secures the bearing element 2 against shifting relative to the brake shoe 10 along the direction of view in FIG. 2. This can be achieved in particular in that the engagement portion on the shoe webs is in each case a preferably rectangular cutout, wherein the walls of the cutout lying in the plane of view or parallel to the plane of view together with the first holding geometry 22a form an undercut which acts transversely with respect to, or perpendicularly to, the holding axis H.

Figure 3:
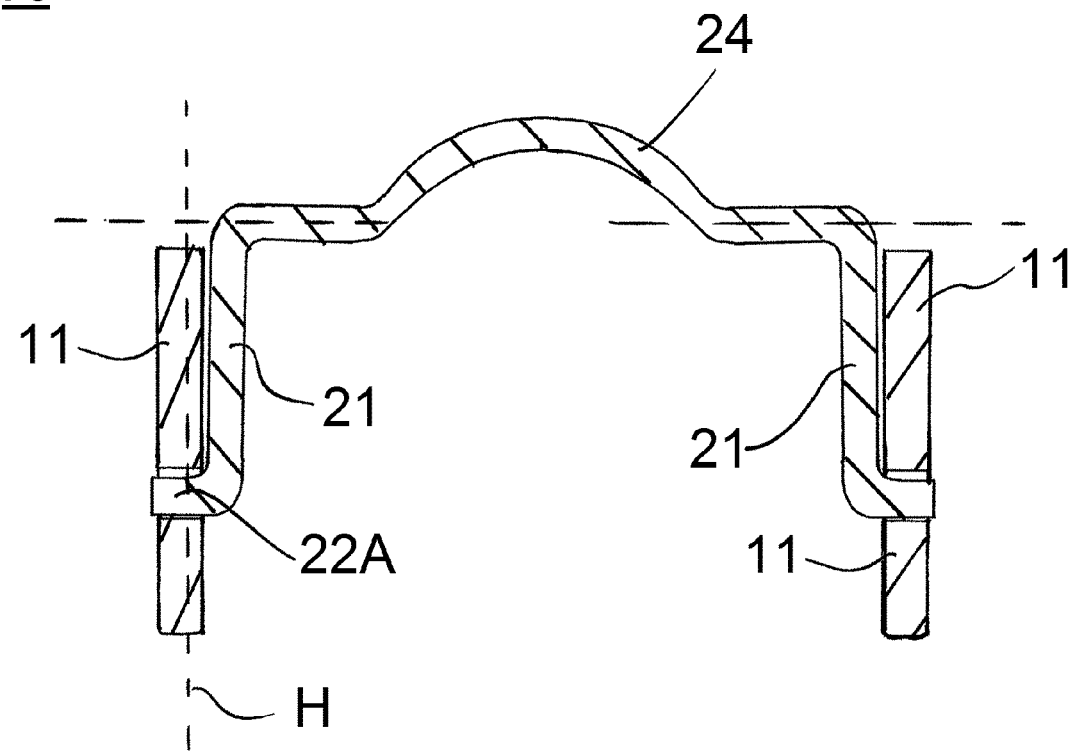
FIG. 3 shows a sectional view of a further preferred embodiment of the bearing element according to the invention.

FIG. 3 shows a further preferred embodiment in which two limbs 21 which each have only a first holding geometry 22a are provided on the bearing element 2. The first holding geometry 22a is designed in this case for absorbing all of the forces in both directions along or parallel to the holding axis H. In other words, as FIG. 3 shows, a second holding geometry 22b can also be omitted and the bearing element 2 can nevertheless be secured in an interlocking manner on a brake shoe 10, in particular two shoe webs 11, as shown in the figure.

Figure 4:
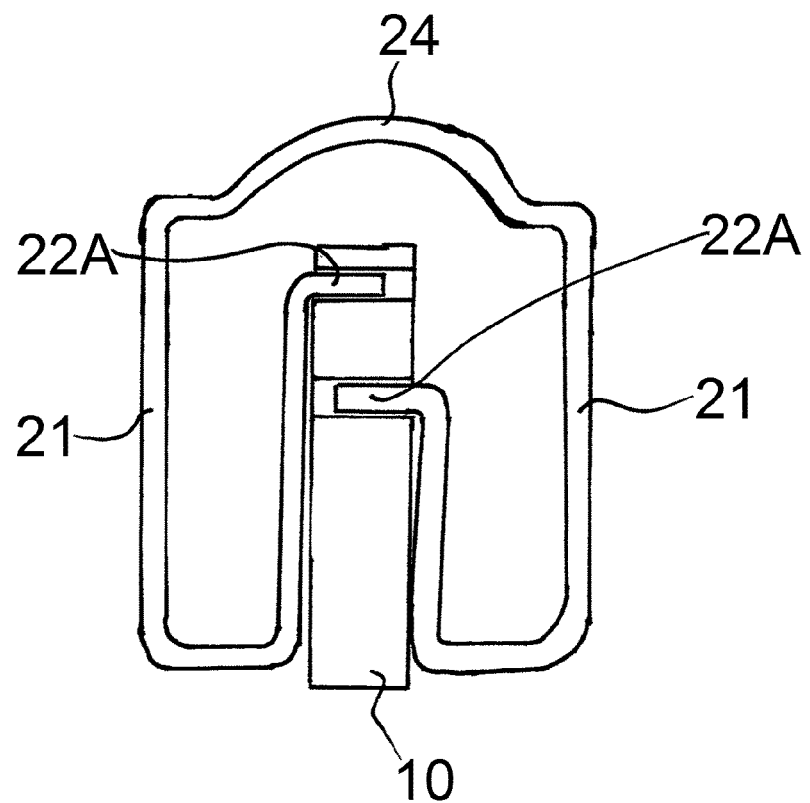
FIG. 4 shows a further view of a preferred embodiment of a bearing element according to the invention.

FIG. 4 shows a further preferred embodiment in which the bearing element 2 is designed for securing on a brake shoe 10 which has only one shoe web 11. For this purpose, in particular, the two limbs 21 of the bearing element are shaped in such a manner that the first holding geometries 22a which are provided on the limbs can be brought into engagement with one and the same shoe web 11 of the brake shoe 10. The preferred embodiment of the bearing element that is shown in FIG. 4 is therefore suitable for use on brake shoes 10 which have only one shoe web 11.

Figure 5:
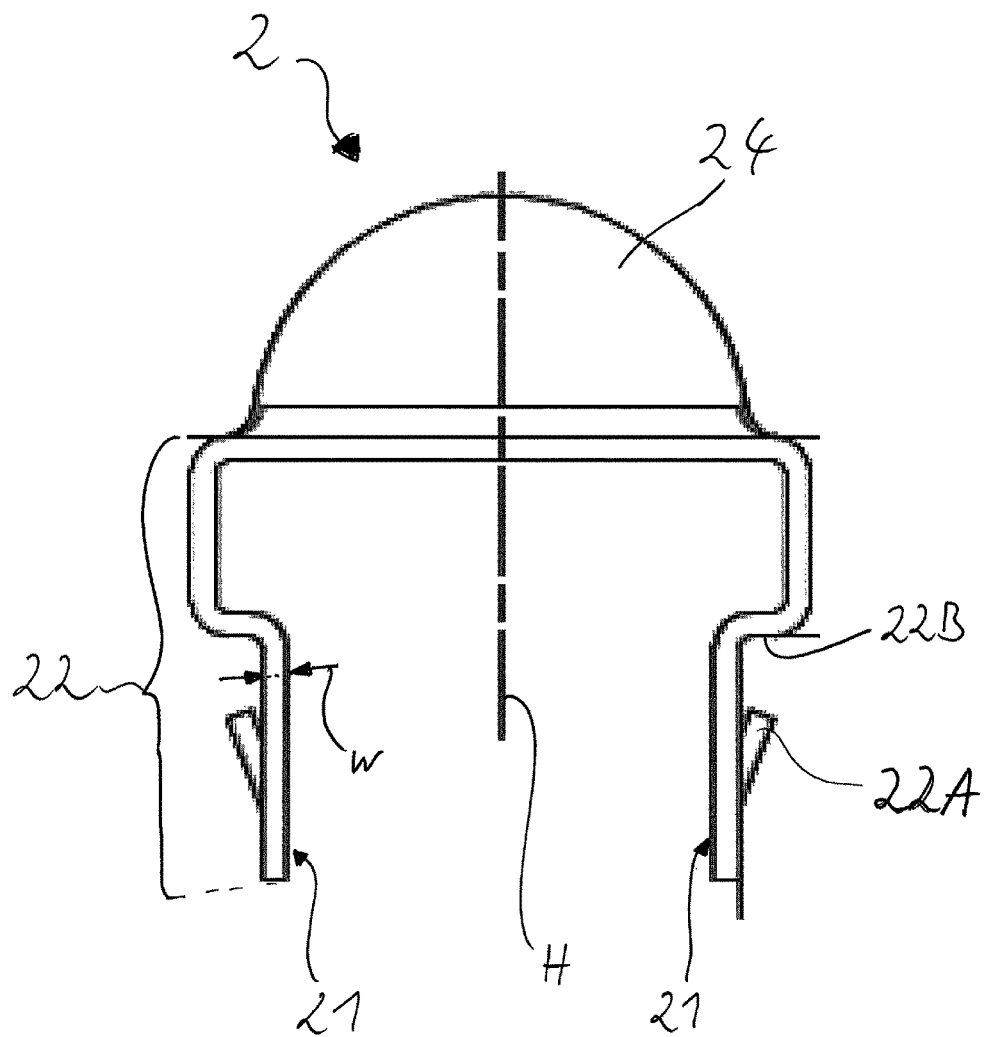
FIG. 5 shows a sectional view of a further preferred embodiment of the bearing element according to the invention.

FIG. 5 shows a further preferred embodiment of the bearing element according to the invention. The holding region 22 of the bearing element substantially corresponds here to the holding region 22 of the bearing element 2 shown in FIG. 2. By contrast, the support region 24 of the bearing element shown in FIG. 5 is preferably of convexly curved design, wherein, in contrast to the object shown in FIG. 2, the bearing element 2 shown in FIG. 5 takes on the functions of the bearing element 2 and of the force transmission element 5. The bearing element 2 shown in FIG. 2 is formed integrally, wherein in particular preferably a sheet metal-like starting material is used and brought into the shape shown in FIG. 5 by deformation. In particular preferably, the wall thickness w of the bearing element 2 is provided here with only a very slight deviation of 0.01 to 0.2 with respect to the average wall thickness of the bearing element. The first holding geometries 22a shown in FIG. 5 are preferably designed as a resettable cantilever region in order to permit the bearing element 2 to be clipped in at the brake shoe 10 (not shown).

LIST OF REFERENCE SIGNS:

2—Bearing element
5—Force transmission element
10—Brake shoe
11—Shoe web
21—Limb
22—Holding region
22A—First holding geometry
22B—Second holding geometry
24—Support region
25—Carrying unit
H—Holding axis
w—Wall thickness

The invention claimed is:

1. A bearing element for use in a drum brake, comprising:
a holding region configured to interlock on a brake shoe;
a carrying unit; and
a support region configured to be indirectly or directly supported on the carrying unit;
wherein the holding region has a first holding geometry which is configured to form an undercut with the brake shoe along a first holding axis;
wherein the support region includes a contact surface that bears directly on the carrying unit and is configured to transmit a support force along the first holding axis directly to the carrying unit, and vice versa;
wherein the support region is substantially convex, and wherein a convex side of the support region is arranged on a side of the bearing element which faces away from the first holding geometry and from the brake shoe; and
wherein the carrying unit includes at least one bearing socket configured to pivotably bear the brake shoe.

2. The bearing element as claimed in claim 1, wherein the holding region has two first holding geometries, and wherein the first holding geometries are arranged respectively on a limb of the bearing element, the holding geometries configured to be brought into interlocking engagement with one shoe web each of the brake shoe.

3. The bearing element as claimed in claim 2, wherein the support region is arranged between the two first holding geometries.

4. The bearing element as claimed in claim 3, wherein the support region is arranged centrally above and between the first holding geometries.

5. The bearing element as claimed in claim 4, wherein the holding region has a second holding geometry, and wherein the second holding geometry is configured to transmit a support force from the bearing element to the brake shoe in only one direction along the holding axis.

6. The bearing element as claimed in claim 5, wherein the second holding geometry comprises a shoulder configured to be brought to rest on a surface or edge of the brake shoe.

7. The bearing element as claimed in claim 6, wherein the bearing element is an integral sheet metal part.

8. The bearing element as claimed in claim 7, wherein one first holding geometry of the two first holding geometries includes a resettable cantilever region, and wherein the first holding geometry is configured to be brought into engagement with the brake shoe in a first direction along the holding axis and provides a secure interlocking connection with the brake shoe in a second direction opposite the first direction.

9. The bearing element as claimed in claim 8, wherein the support region has a receiving geometry for receiving a force transmission body, and wherein the force transmission body transmits the support force acting between the carrying unit and the bearing element.

10. The bearing element as claimed in claim 9, wherein the force transmission body is substantially spherical.

11. The bearing element as claimed in claim 10, wherein the bearing element has a wall thickness measured in each case perpendicularly to the outer surface, and wherein a deviation of the wall thickness from an average wall thickness does not exceed 0.01 to 0.2 times, an average wall thickness.

12. The bearing element as claimed in claim 11, wherein the deviation of the wall thickness from the average wall thickness does not exceed 0.01 to 0.1 times the average wall thickness.

13. The bearing element as claimed in claim 12, wherein the deviation of the wall thickness from the average wall thickness does not exceed 0.05 to 0.1 times the average wall thickness.

14. The bearing element as claimed in claim 11, wherein the bearing element is produced by cold forming, and wherein a strain hardened structure is located in deformation regions of the bearing element.

15. The bearing element as claimed in claim 1, wherein the bearing element is an integral sheet metal part.

16. The bearing element as claimed in claim 1, wherein the first holding geometry includes a resettable cantilever region, and wherein the first holding geometry is configured to be brought into engagement with the brake shoe in a first direction along the holding axis and provides a secure interlocking connection with the brake shoe in a second direction opposite the first direction.

17. The bearing element as claimed in claim 1, wherein the support region has a receiving geometry for receiving a force transmission body, and wherein the force transmission body transmits the support force acting between the carrying unit and the bearing element.

18. The bearing element as claimed in claim 17, wherein the force transmission body is substantially spherical.

19. A bearing element for use in a drum brake, comprising:
a holding region configured to interlock on a brake shoe; and
a support region configured to be indirectly or directly supported on a carrying unit;
wherein the holding region has a first holding geometry which is configured to form an undercut with the brake shoe along a first holding axis;
wherein the support region is configured to indirectly or directly transmit a support force along the first holding axis indirectly or directly to the carrying unit, and vice versa;
wherein the support region is substantially convex, and wherein a convex side of the support region is arranged on a side of the bearing element which faces away from the first holding geometry;
wherein the carrying unit includes at least one bearing socket configured to pivotably bear the brake shoe; and
wherein the bearing element has a wall thickness measured in each case perpendicularly to the outer surface, and wherein a deviation of the wall thickness from an average wall thickness does not exceed 0.01 to 0.2 times the average wall thickness.

20. The bearing element as claimed in claim 19, wherein the deviation of the wall thickness from the average wall thickness does not exceed 0.01 to 0.1 times the average wall thickness.

21. The bearing element as claimed in claim 20, wherein the deviation of the wall thickness from the average wall thickness does not exceed 0.05 to 0.1 times the average wall thickness.

22. The bearing element as claimed in claim 1, wherein the bearing element is produced by cold forming, and wherein a strain hardened structure is located in deformation regions of the bearing element.

23. A bearing element for use in a drum brake, comprising:
a holding region interlocked on a brake shoe;
a carrying unit; and
a support region configured to be indirectly or directly supported on the carrying unit;
wherein the holding region has a first holding geometry which is configured to form an undercut with the brake shoe along a first holding axis and extend in an axial direction with respect to the brake shoe;
wherein the support region includes a contact surface that bears directly on the carrying unit and is configured to transmit a support force along the first holding axis directly to the carrying unit, and vice versa; and
wherein the support region is substantially convex, and wherein a convex side of the support region is arranged on a side of the bearing element which faces away from the first holding geometry and from the brake shoe and extends in a radial direction with respect to the brake shoe.

24. The bearing element as claimed in claim 1, wherein the first holding geometry extends inwardly toward the brake shoe.

* * * * *